United States Patent
Dropps

(10) Patent No.: US 9,411,400 B1
(45) Date of Patent: Aug. 9, 2016

(54) METHODS AND SYSTEMS FOR ADVERTSING AVAILABLE CREDIT AT MEMORY OF NETWORK DEVICE PORTS BASED ON TEMPERATURE

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 324 days.

(21) Appl. No.: 13/949,095

(22) Filed: Jul. 23, 2013

(51) Int. Cl.
*G06F 1/32* (2006.01)

(52) U.S. Cl.
CPC .................... *G06F 1/3234* (2013.01)

(58) Field of Classification Search
USPC ....................................... 713/300 S
See application file for complete search history.

(56) References Cited

U.S. PATENT DOCUMENTS

| | | | |
|---|---|---|---|
| 6,281,738 B1* | 8/2001 | Kamiya | 327/513 |
| 6,687,165 B1* | 2/2004 | Cioaca | 365/189.05 |
| 6,718,139 B1* | 4/2004 | Finan et al. | 398/59 |
| 8,806,031 B1* | 8/2014 | Kondur et al. | 709/228 |
| 8,964,547 B1* | 2/2015 | Rygh | H04L 47/39 370/235 |
| 2012/0096293 A1* | 4/2012 | Floyd et al. | 713/323 |
| 2013/0322331 A1* | 12/2013 | Ramkumar | H04W 28/10 370/328 |

* cited by examiner

*Primary Examiner* — Thomas Lee
*Assistant Examiner* — Danny Chan
(74) *Attorney, Agent, or Firm* — Klein, O'Neill & Singh, LLP

(57) ABSTRACT

Machine-implemented method for a network device is provided. A temperature (T) of an application specific integrated circuit (ASIC) for the network device is compared with a first threshold value. A receive buffer for the network device is placed in an active state, when T is below the first threshold value, and then increasing available credit to store information at the receive buffer. T is also compared with a second threshold value and when T has reached or exceeded the second threshold value, one or more receive buffers are placed in a reduced power state when one or more receive buffers are not currently storing any information.

20 Claims, 5 Drawing Sheets

METHODS AND SYSTEMS FOR ADVERTSING AVAILABLE CREDIT AT MEMORY OF NETWORK DEVICE PORTS BASED ON TEMPERATURE

BACKGROUND

1. Technical Field

The present disclosure relates to networks and network devices.

2. Related Art

Networking systems are commonly used to move network information (which may also be referred to interchangeably as frames, packets, data or commands) between computing systems (for example, servers) or between computing systems and network devices (for example, storage systems). Various hardware and software components are used to implement network communication.

Network devices continue to improve in processing information at faster rates. Power consumption and thermal management in network devices continue to be a challenge. Continuous efforts are being made to improve power consumption in network devices.

SUMMARY

The present embodiments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

In one embodiment, a machine-implemented method is provided. The method includes comparing a temperature (T) of an application specific integrated circuit (ASIC) for a network device with a first threshold value; placing a receive buffer for a port of the network in an active state, when T is below the first threshold value, with increased available credit to store information at the receive buffer; and comparing T with a second threshold value and when T has reached or exceeded the second threshold value, placing one or more receive buffers in a reduced power state, when the one or more receive buffers are not storing any information.

In another embodiment, a network device having an application specific integrated circuit (ASIC) whose temperature (T) is measured by a temperature sensor is provided. The temperature T is provided to a power controller that is configured to compare T with a first threshold value and when T is below the first threshold value, a receive buffer for a port of the network is placed in an active state. T is also compared with a second threshold value and when T has reached the second threshold value, one or more receive buffers for one or more ports of the network device are placed in a reduced non-active power state, when the one or more receive buffers are not storing any information.

In yet another embodiment, a network device, having an application specific integrated circuit (ASIC) whose temperature (T) is measured by a temperature sensor is provided. The temperature T is provided to a power controller that is configured to compare T with a first threshold value and place a receive buffer for a port of the network in an active state, when T is below the first threshold value. T is also compared with a second threshold value and when T has reached the second threshold value, one or more receive buffers for one or more ports of the network device is placed in a reduced power state, when the one or more receive buffers are not currently storing any information. Before placing the one or more receive buffers in the reduced power state, flow control for the receive buffers is adjusted by decreasing an amount of credit that is advertised to other devices communicating with the network device.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features. These embodiments depict the novel and non-obvious systems and methods in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

Figure 1:
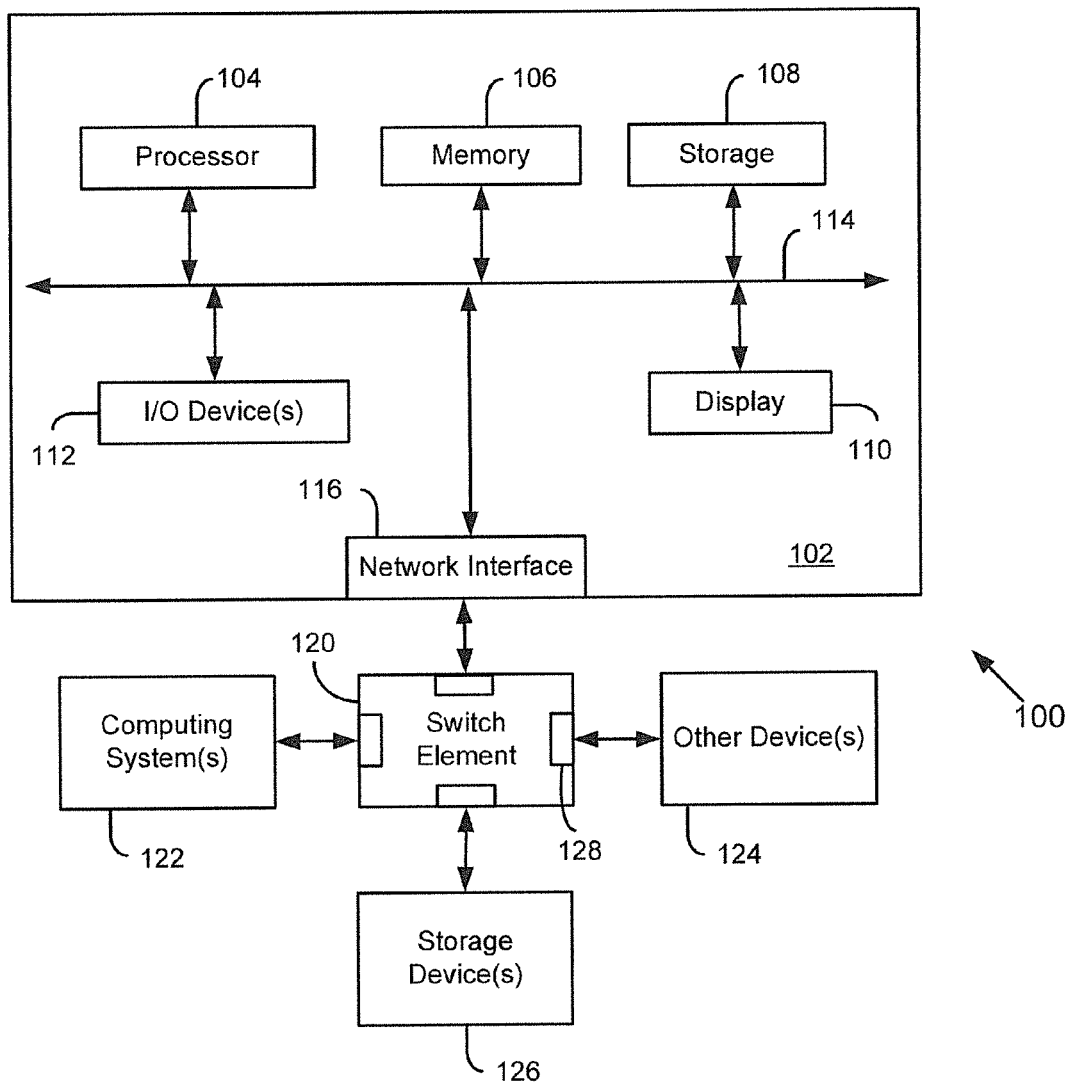

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission technology for storage and network protocols such as HIPPI, SCSI, IP, ATM and others. Fibre Channel provides an input/output interface to meet the requirements of both channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold frames received and sent across a network. Associated with these buffers are credits, which are the number of frames that a buffer can hold per Fabric port.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environments. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 illustrates an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter, such as that provided by QLogic Corporation.

In one embodiment, the processor 104 of the host system 102 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports 128 for receiving and transmitting information, for example, node ports (N_Ports), Fabric ports (F_Ports), and expansion ports (E_Ports). Node ports may be located in a node device, e.g. the network interface 116 of host system 102 and interface (not shown) for the storage devices 126. Fabric ports are typically located in Fabric devices, such as the switch 120. Details regarding the switch 120 are provided below.

Figure 2A:
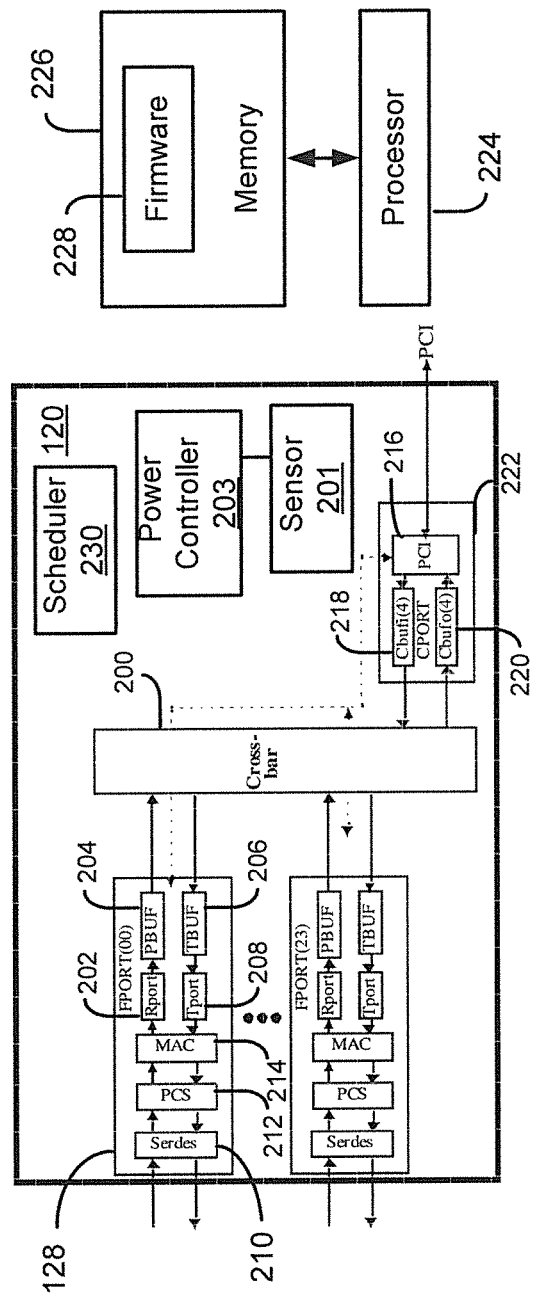
FIG. 2A is a functional block diagram of a switch element according to the present embodiments.

FIG. 2A is a high-level block diagram of a network device (for example, switch 120, also referred to as the switch element 120), according to one embodiment. Switch element 120 may be implemented as an application specific integrated circuit (ASIC) having a plurality of ports 128. The ports 128 are generic (GL) and may include an N_Port, F_Port, FL_Port, E-Port, or any other port type. The ports 128 may be configured to operate as Fibre Channel, FCoE, or Ethernet ports. In other words, depending upon what it is attached to, each GL port can function as any type of port. As an example, the ports 128 of FIG. 2A are drawn on the same side of the switch element 120. However, the ports 128 may be located on any or all sides of switch element 120. This does not imply any difference in port or ASIC design. The actual physical layout of the ports will depend on the physical layout of the ASIC.

The ports 128 communicate via a switch crossbar 200, which may include a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a port 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared pipeline for receiving frames (or information). The pipeline includes a serializer/deserializer (SERDES) 210, a physical coding sub-layer (PCS) 212, and a media access control (MAC) sub-layer 214. The SERDES 210 receives incoming serial data and converts it to parallel data. The parallel data is then sent to the PCS 212 and the MAC 214 before being sent to a receive segment (or receive port (RPORT) 202. PCS 212 performs data decoding/encoding, the details of which are not germane to the embodiments disclosed herein.

The RPORT 202 temporarily stores received frames at a memory storage device, shown as PBUF (pause buffer) 204. The frames are then sent to a transmit segment (or transmit port (TPORT)) 208 via the crossbar 200 and a transmit buffer (TBUF) 206. The TBUF 206 is a temporary memory storage device where frames or information related to frames are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames from the processor 224 to the ports 128. The CPORT 216 further includes an output buffer (CBUFO) 220, which is used to send frames from the PBUFs 204, the TBUFs 206, and CBUFI 218 to the processor 224.

Switch element 120 includes a power controller 203 that receives ASIC die temperature information from temperature sensor 201. For illustration sake, only one sensor has been shown, but multiple sensors may be used to track any change in temperature of the ASIC. In one embodiment, temperature sensor value or average die temperature is compared with one or more threshold values. If the temperature is high, then power to one or more receive buffers may be turned off, as described below in detail. Thus receive buffer usage in switch element 120 may be associated with overall ASIC temperature.

Port 128 described above may be referred to as a "base-port" that may have more than one network link available for receiving and transmitting information. Each network link allows the base-port to be configured into a plurality of sub-ports, each uniquely identified for receiving and sending frames. The configuration may vary based on protocol and transfer rates. For example, port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel ports, four single lane Fibre Channel ports, two double lane Ethernet ports, 1 double lane Ethernet port and two single lane Ethernet ports, one double lane Ethernet port, one single lane Ethernet port and one single lane Fibre Channel port, one double lane Ethernet port and two single lane Fibre Channel ports, one four lane Ethernet port, or one four lane Fibre Channel port. Port 128 uses some logic that is shared among the multiple sub-ports and some logic that is dedicated to each sub-port.

Switch 120 also includes a scheduler 230 (may also be referred to as global scheduler 230) that schedules frame transmissions from one or more ports of the switch. Global scheduler 230 interfaces with various switch modules to schedule frame transmissions.

Figure 2B:
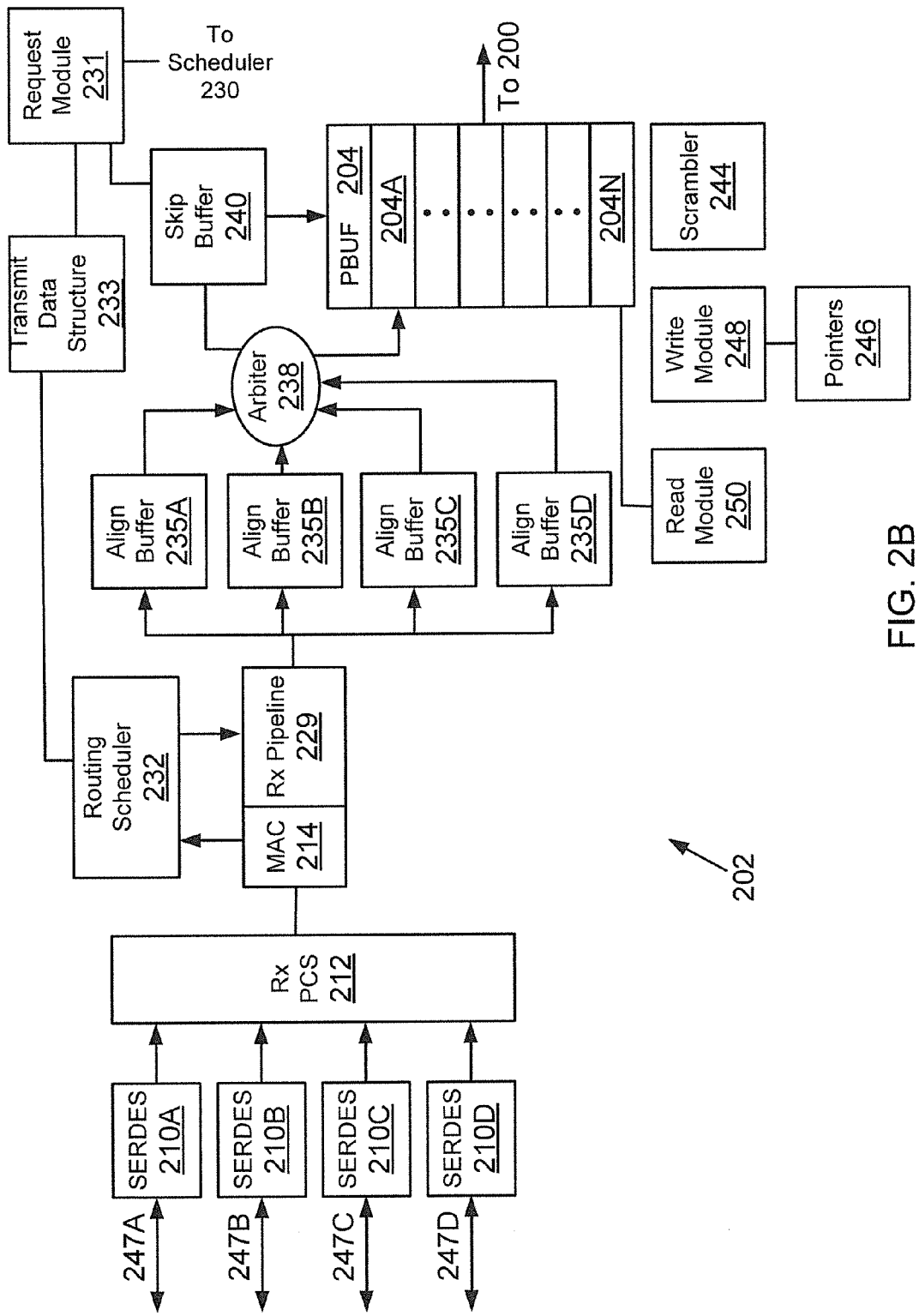
FIG. 2B is a functional a block diagram of an RPORT, according to one embodiment.

FIG. 2B illustrates an example of RPORT 202 of base-port 128, according to one embodiment. RPORT 128 may be coupled to four independent physical network links (or lanes) 247A-247D, each configured to operate as a portion of an independent sub-port. Each network link is coupled to one of the SERDES 210A-210D that share PCS 212 and MAC 214. The multiple lanes also share a receive pipeline 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 are part of the receive pipeline 229.

Information regarding the frame or a copy of the frame is also provided to a routing sequencer 232 that determines the destination of the received packets. In one embodiment, a frame whose destination is processor 224 is given the highest priority, followed by a frame that is routed by a TCAM (ternary content addressable memory) or steering registers located within the routing sequencer 232. More than one routing sequencer may be used for each base-port 128. Frames that are ready to be sent out are then staged at PBUF 204. PBUF 204 may have a plurality of queues that may be referred to as receive queues. The receive queues temporarily store frames, until a request to move the frame is granted.

To move frames from the receive queues; a request module 231 generates requests for a global scheduler 230, also referred to as scheduler 230. Request module 231 maintains a data structure 233 (shown as transmit data structure) that tracks a number of requests that may be pending for each sub-port. Request module 231 also removes requests from the data structure when a grant is received for a particular request.

RPORT 202 includes a plurality of align buffers (or first stage buffers/first stage storage devices) 235A-235D that are used for staging frames before they can be stored at a skip buffer (or second stage buffer/second stage storage device) 240 or a shared PBUF 204, as described below in detail. In one embodiment, the align buffers 235A-235D are dedicated to each network lane 247A-247D and are used to align the data to match the PBUF 204 slot sizes. In another embodiment, the align buffers 235A-235D may be shared among the different lanes.

Align buffers 235A-235D hold part of a frame until a current frame write operation is complete. In one embodiment, align buffers 235A-235D are used to hold double words received from MAC 214 at a system clock for the various modules of port 128. The system clock may be generated by an oscillator (not shown), the details of which are not germane to embodiments disclosed herein. The system clock may be 825 Mhz, for example, or any other speed. The align buffers 235A-235D may also hold part of a frame, in case the skip buffer 240 has reached its threshold value, e.g., it is full. The term "buffer" as used herein indicates a storage location/device used for storing information.

Frames are selected from the align buffers 235A-235D by an arbitration module 238. In one embodiment, PBUF 204 may be a dynamic random access memory (DRAM) device. PBUF 204 may include a plurality of storage locations 204A-204N (may also be referred to as slots) for storing frames.

RPORT 202 includes a read module 250 for controlling and managing read operations from PBUF 204. The read operation may be performed across multiple time slices (or time slots). The read module 250 knows which lane and which queue the data has been written from. The read module 250 is also aware of the start of a frame (SOF) so it knows when to roll over a read counter (not shown) that is maintained by the read module 250. The read address is compared with the write address to ensure that it does not exceed the write address for a cut-through frame.

RPORT 202 further includes a write module 248 that controls writing to storage locations 204A-204N. Pointers 246 are maintained by write module 248 indicating where information is stored at PBUF 204 or at skip buffer 240.

RPORT 202 includes a scrambler module 244 for scrambling bank (or memory storage device location/slot) address locations of PBUF 204 that is used for writing a frame at PBUF 204. The bank address is scrambled differently for each sub-port. Instead of a frame always starting in bank 0, the starting bank is scrambled, allowing each sub-port to have a different frame starting bank. One reason for scrambling the address is to reduce bank conflict for accessing a storage location.

The skip buffer 240 may be used to prevent bank contention at PBUF 204. For example, if skip buffer has 16 slots and 10 (first threshold value) of them become full, then the skip buffer 204 may send a signal to the global scheduler 230 to prevent additional PBUF read operations by stopping more grants from being issued. In another embodiment, the skip buffer 204 may send a signal to the request module 231 inhibiting the request module 231 from sending a request to the global scheduler 230. If no requests are made, no grants are issued, and if no grants are issued a new PBUF 204 read operation will not be started. The skip buffer 240 allows the request module 231 to resume sending the signals to scheduler 230 when it has less than a second threshold value entries (for example, 4 or less of 16).

Figure 3:
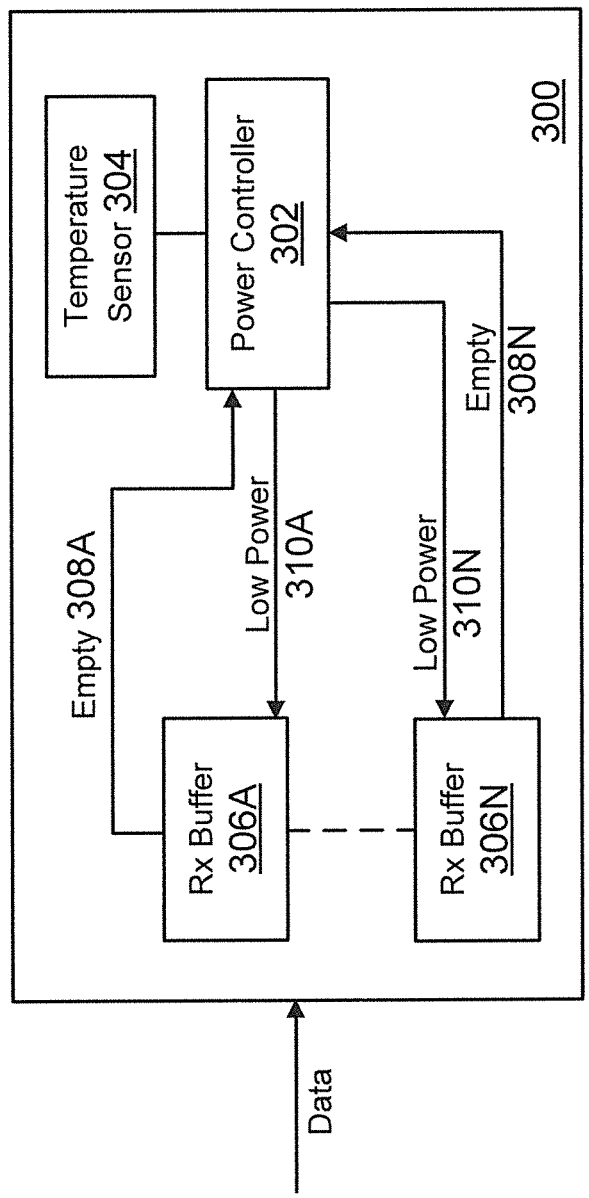
FIG. 3 is a block diagram of a system, according to one embodiment.

FIG. 3 shows an example of a network device 300 using a power controller 302 (similar to 203, FIG. 2A), according to one embodiment. The network device uses a plurality of buffers 306A-306N to temporarily store information. The information may be received from another device. The receive buffers may be located at different base-ports of the network device, when the network device uses base-ports. The embodiments described herein are not limited to base-ports. Each receive buffer sends an indicator 308A-308N to power controller 302 indicating if the receive buffer is empty at any given time or alternately provides that it is readable on demand.

The power controller 302 also receives temperature data from one or more temperature sensors 304. The power controller 302 compares the ASIC temperature with one or more threshold values. Based on the comparison and the state of the receive buffers, power to the receive buffer memories may be removed or asserted to a low value, as indicated by signals 310A-310N thereby disabling them. In another embodiment, the power controller 302, may place the receive buffer memories into a lower power state like sleep or "deep sleep". The opposite action, making more receive buffer memories active, may be performed when the ASIC temperature is compared below one or snore threshold values.

Figure 4:
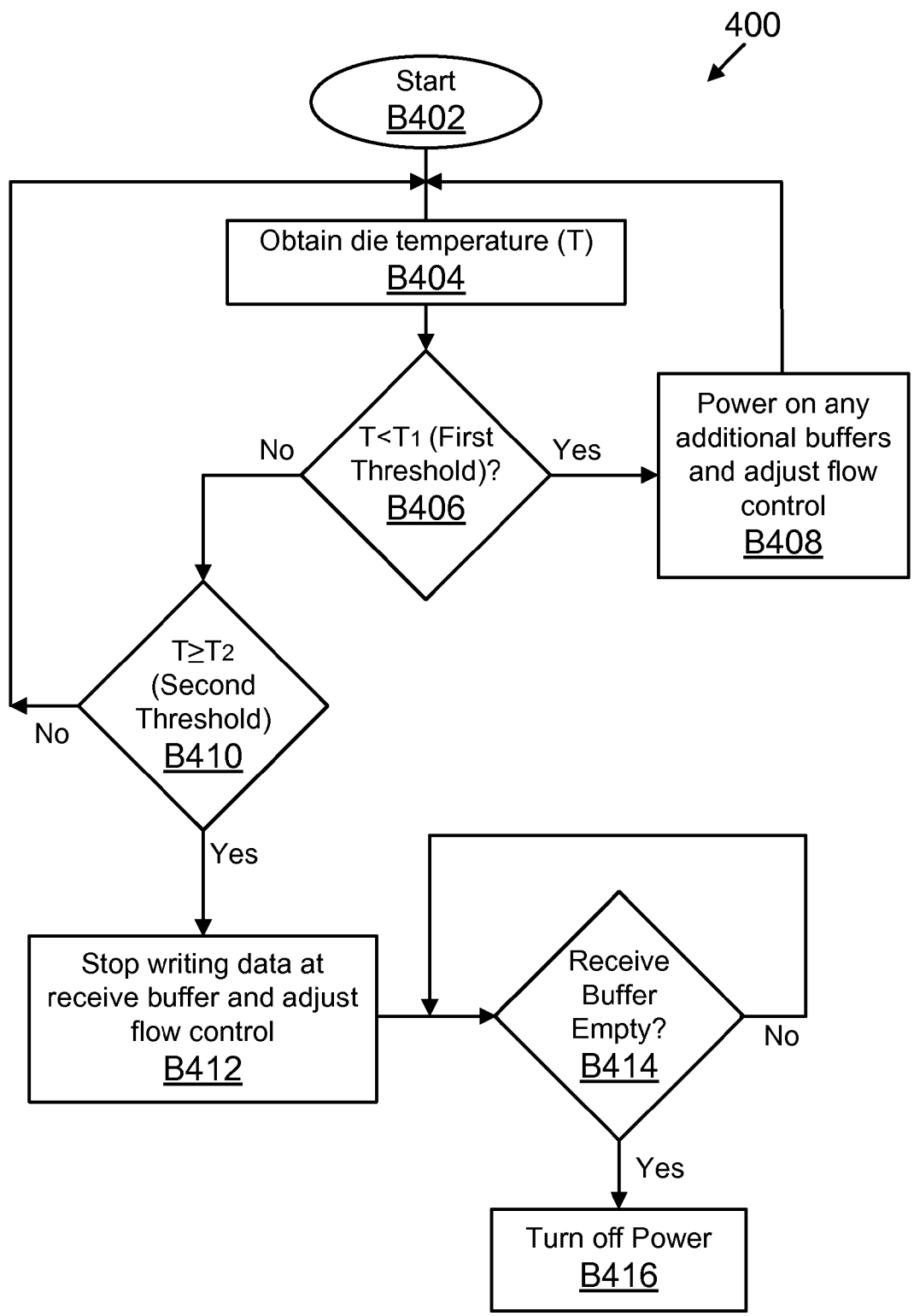
FIG. 4 is a process flow diagram for managing power in a network device, according to one embodiment.

FIG. 4 shows a process 400 for using the system of FIG. 3, according to one embodiment. The process begins in block B402, when network device 300 is operational and communicating with other devices. In block B404, the power controller 302 obtains die or ASIC temperature (T) from one or more temperature sensors 304. It is noteworthy that T may be the temperature at any given time or an average temperature of at least two temperature samples over a given duration.

In block B406, temperature T is compared with a first temperature threshold value T1. If T is less than T1, then, power controller 302 powers any additional buffers that may be powered off or places the receive buffers in an active state. The active state means that the buffers can be used to store information. The network device also adjusts flow control when the additional buffers are placed in the active state. The term "flow control" means that the port having the powered on receive buffer can advertise to another device or link partner that it has more storage space to store information. If the port is operating as a Fibre Channel protocol port, then the port can advertise more "credit" so that link partner transmitter can send more information. If the port is operating as an Ethernet protocol port, then the port can adjust a pause threshold and current pause state to advertise more "credit" so that the link partner transmitter can send more information. If no flow control is being used on the link, then this additional credit advertisement may not be needed. A port not using flow control may drop fewer packets if more receive buffer memories are available.

If T is not less than T1, as determined in block B406, then in block B410, the power controller 302 compares T with a second threshold value (T2). If T is less than T2 then the process simply reverts back to block B404. If T is equal to or greater than T2 (or has reached T2), then in block B412, network device 300 may elect not to write anymore new data. The affected receive buffers adjust flow control by reducing the amount of credit for transmitters. This ensures that other devices are not sending information when the buffers are being powered down. In block B414, the power controller 302 determines if any of the receive buffers are empty. This may be ascertained based on signals 308A-308N or other status that may be provided. If none of the receive buffers are empty, then the process simply waits till one of the receive buffers become empty. Thereafter, in block B416, power controller 302 turns off power to the empty receive buffer or places the empty receive buffer to a low power or reduced, inactive power state. The inactive power state means that the receive buffers are not currently used for storing information. The process then moves back to block B404.

It is noteworthy that the threshold values may be programmed and stored at a memory location (for example, 226) that is accessible to power controller 302. Furthermore, even though a separate power controller 302 is shown in FIG. 3, processor 224 may be used to execute one or more of the process steps of FIG. 4.

The embodiments disclosed herein manage power for an ASIC by powering on or powering up memories that are used to receive information from other devices. The flow control for the receive buffers and the network device is maintained by sending the appropriate credit when a buffer is power on or powered off.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments disclosed above may be implemented in any network device, including an adapter, router, network interface card and others. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine-implemented method, comprising:
comparing a temperature (T) of an application specific integrated circuit (ASIC) of a network device with a first threshold value, the network device having a port with a plurality of receive buffers for storing information received from other devices;
placing a receive buffer from among the plurality of receive buffers for the port of the network in an active state, when T is below the first threshold value, wherein, when the port with the receive buffer that is placed in the active state uses flow control, wherein said flow control increasing available credit advertised to the other devices, the other devices can send more information to the port; and wherein when the port with the receive buffer placed in the active state does not use said flow control, the port drops fewer packets in the active state;
comparing T with a second threshold value and when T has reached the second threshold value;
determining if one or more receive buffers are empty; and
placing one or more receive buffers in a reduced power state, when the one or more receive buffers are empty and are not in the process of storing any received information; wherein before placing the one or more receive buffers in the reduced power state, credit advertised to the other devices is decreased such that the other devices do not send information to the port while the one or more receive buffers are being placed in the reduced power state.

2. The method of claim 1, wherein the network device is a switch element having a plurality of ports for sending and receiving information.

3. The method of claim 2, wherein one of the plurality of ports is configured to operate as a Fibre Channel port.

4. The method of claim 2, wherein one of the plurality of ports is configured to operate as an Ethernet or Fibre Channel over Ethernet port.

5. The method of claim 1, wherein the network device is an adapter having the port for sending and receiving information to and from another device.

6. A network device, comprising:
an application specific integrated circuit (ASIC) having a port with a plurality of receive buffers for storing information received from other devices, where the ASIC temperature (T) is measured by a temperature sensor and then provided to a power controller that is configured to compare T with a first threshold value and when T is below the first threshold value, place a receive buffer for the port of the network in an active state and increase available credit advertised to the other devices such that the other devices can send more information to the port, when the port uses credit based flow control and the port drops fewer packets, when the port is not using credit based flow control; wherein said flow control increases available credit advertised to the other devices; and compare T with a second threshold value, and when T has reached the second threshold value, determine if one or more receive buffers are empty; place one or more receive buffers of the network device in a reduced non-active power state, when the one or more receive buffers are empty and are not in the process of storing any information; wherein before placing the one or more receive buffers in the reduced non-active power state, credit advertised to the other devices is decreased such that the other devices do not send information to the port while the one or more receive buffers are being placed in the reduced non-active power state.

7. The network device of claim 6, wherein the network device is a switch element having a plurality of ports for sending and receiving information.

8. The network device of claim 7, wherein one of the plurality of ports is configured to operate as a Fibre Channel port.

9. The network device of claim 7, wherein one of the plurality of ports is configured to operate as an Ethernet or Fibre Channel over Ethernet port.

10. The network device of claim 6, wherein the network device is an adapter having the port for sending and receiving information to and from another device.

11. The network device of claim 6, wherein the first threshold and the second threshold values are stored at a memory device that is accessible to the power controller.

12. The network device of claim 6, wherein T is a current operating temperature for the ASIC.

13. The network device of claim 6, wherein T is an average temperature value of at least two temperature samples over a duration.

14. A non-transitory, machine readable storage medium having stored thereon instructions for performing a method, comprising machine executable code which when executed by at least one machine, causes the machine to:
compare a temperature (T) of an application specific integrated circuit (ASIC) of a network device with a first threshold value, the network device having a port with a plurality of receive buffers for storing information received from other devices;
place a receive buffer from among the plurality of receive buffers for the port of the network in an active state, when T is below the first threshold value, wherein, when the port with the receive buffer that is placed in the active state uses flow control, wherein said flow control increasing available credit advertised to the other devices, the other devices can send more information to the port; and wherein when the port with the received buffer placed in the active state does not use said flow control, the port drops fewer packets in the active state: and
compare T with a second threshold value and when T has reached the second threshold value, determine if one or more receive buffers are empty: place one or more receive buffers in a reduced power state, when the one or more receive buffers are empty and are not storing any received information; wherein before placing the one or more receive buffers in the reduced power state, credit advertised to the other devices is decreased such that the other devices do not send information to the port while the one or more receive buffers are being placed in the reduced power state.

15. The non-transitory, storage medium of claim 14, wherein the network device is a switch element having a plurality of ports for sending and receiving information.

16. The non-transitory, storage medium of claim 15, wherein one of the plurality of ports is configured to operate as a Fibre Channel port.

17. The non-transitory, storage medium of claim 15, wherein one of the plurality of ports is configured to operate as an Ethernet or Fibre Channel over Ethernet port.

18. The non-transitory, storage medium of claim 14, wherein the network device is an adapter having the port for sending and receiving information to and from another device.

19. The non-transitory, storage medium of claim 14, wherein T is a current operating temperature for the ASIC.

20. The non-transitory, storage medium of claim 14, wherein T is an average temperature value of at least two temperature samples over a duration.

* * * * *